United States Patent [19]

Christ

[11] Patent Number: 5,230,206

[45] Date of Patent: Jul. 27, 1993

[54] METHOD OF AND SYSTEM FOR MAKING UP CONSIGNMENTS OF ARTICLES

[76] Inventor: Ferdinand Christ, Lindenstrasse 9, 6761 Weitersweiler, Fed. Rep. of Germany

[21] Appl. No.: 697,760

[22] Filed: May 9, 1991

[30] Foreign Application Priority Data

May 17, 1990 [DE] Fed. Rep. of Germany ....... 4015935

[51] Int. Cl.$^5$ .................. B65B 35/04; B65B 35/54; B65B 57/20
[52] U.S. Cl. ........................................ 53/501; 53/154; 53/168; 53/500; 221/11
[58] Field of Search .................. 53/501, , 474, 473, 53/155, 154, 168, 498, 500; 221/12, 11, 94

[56] References Cited

U.S. PATENT DOCUMENTS

| | | | |
|---|---|---|---|
| 2,630,951 | 3/1953 | Slightam | 53/154 X |
| 2,808,946 | 10/1957 | Just et al. | 214/16 |
| 3,024,944 | 3/1962 | Pierce | 221/11 |
| 3,076,566 | 2/1963 | Dennis | 221/94 X |
| 3,231,102 | 1/1966 | Boyle et al. | 221/11 X |
| 4,426,189 | 1/1984 | Weber et al. | 414/786 |
| 4,870,799 | 10/1989 | Bergerioux et al. | 53/168 X |

FOREIGN PATENT DOCUMENTS

| | | |
|---|---|---|
| 0052232 | 5/1985 | European Pat. Off. . |
| 0183074 | 6/1986 | European Pat. Off. . |
| 925879 | 3/1955 | Fed. Rep. of Germany . |
| 2736197 | 2/1979 | Fed. Rep. of Germany . |
| 2601027 | 3/1980 | Fed. Rep. of Germany . |
| 3036293 | 1/1983 | Fed. Rep. of Germany . |
| 3302596 | 5/1984 | Fed. Rep. of Germany . |
| 3317073 | 11/1984 | Fed. Rep. of Germany . |
| 3348171 | 11/1984 | Fed. Rep. of Germany . |
| 3412025 | 2/1986 | Fed. Rep. of Germany . |
| 3533382 | 6/1986 | Fed. Rep. of Germany . |
| 3524344 | 1/1987 | Fed. Rep. of Germany . |
| 3335289 | 7/1989 | Fed. Rep. of Germany . |
| 266333 | 3/1989 | German Democratic Rep. . |
| 2147282A | 5/1985 | United Kingdom . |

OTHER PUBLICATIONS

"Industrie-Anzeiger", May 11, 1973, edition No. 40, pp. 824–826.
"Transport, forder-und lagertechnik", 1984, No. 4, pp. 9–12.
"Fordern und heben", 1969, No. 12, pp. 727–732.
"Transport, forder-und lagertechnik"; 1979, No. 12, pp. 22,23.
"Piece Sorter", VanDerLande Industries (no date).

Primary Examiner—James F. Coan
Attorney, Agent, or Firm—Marshall, O'Toole, Gerstein, Murray & Bicknell

[57] ABSTRACT

The invention provides a method and a system for making up consignments from articles supplied in packs. It consists essentially of a consignment-assembly unit (9) that supplies individually supplied articles via a sorter (10) having inward conveyors (30,31) to an array of rack sections (14) through which the articles pass to be assembled into consignments via an outward conveyor (32). The individual articles are unpacked from the packs and the packs are temporally buffered by means of an intermediate store (6). Control is effected by a computer (2) which issues control data (d) to the intermediate store (6) and the various positions of the consignment-assembly unit (9) on the basis of goods received data (a) and customer order data (b) so as to determine, starting from the intermediate store (6), which article is to pass at which time to any particular rack section (14) and is to be available at a further particular time at the outlet in a consignment.

29 Claims, 3 Drawing Sheets

METHOD OF AND SYSTEM FOR MAKING UP CONSIGNMENTS OF ARTICLES

TECHNICAL FIELD OF THE INVENTION

The invention relates to a method of and a system for making up consignments of articles.

BACKGROUND OF THE INVENTION AND PRIOR ART

Particularly in the mail-order business, and above all in the wholesale mail-order business, order consignments for specific customers have to be assembled from what is often a very large stock of different articles. In practice the articles required for a particular order consignment are taken by hand from fixed racks containing articles of the same kind and are placed on a circulating rack-like container that is assigned to a particular consignment. After completing and checking the consignment it is packed by hand and dispatched. The contents of the fixed racks for the articles have to be checked and the racks restocked. For this purpose the articles have to be unpacked from a pack that has been supplied to and inspected at a goods receiving point, taken to the racks by a conveyor system and there transferred by hand. This procedure is not only inconvenient, time-consuming and wasteful of space, but also is a source of mistakes. As a result of the manual handling articles may be taken from or placed in the wrong storage rack. Restocking of racks may be overlooked, and the articles that have nevertheless been supplied via the conveyor system carried on to an overflow area in which they remain until, also by hand, the overflow area is emptied. Since the storage rack will still be short of the article concerned, this can result in further articles being called up from the receiving point or associated storage racks and possibly also to orders for further supplies being issued even though in fact there is still an adequate stock of the articles available. The procedure used in practice therefore also has economic disadvantages. In fact it is desirable on economic grounds to keep the turn-round time of the articles from their supply to their inclusion in a specific customer order consignment as short as possible, while still being able to deal with all the incoming customer orders completely and as quickly as possible. The aim here is to provide a 24-hour service.

A first step towards achieving this is provided by computer-controlled automatic consignment-assembly units. One such unit is provided for example in EP-A-183 074. This known consignment-assembly unit includes stock containers arranged in the form of chutes in rows and columns and running from a loading to an unloading end. At the unloading end there is a dispensing device with a counter. The various stock containers are refilled by hand with the respective articles to be stored temporarily in them when an alarm signal indicates that the content has fallen below a minimum level. A computer controls the dispenser of each stock container according to whether there is a specific customer consignment order so that at a predetermined time one or more of the articles is or are supplied to an outward conveying system such as a conveyor belt. The delivery takes place at a time determined by the computer in such a way that the various articles making up an order arrive assembled in a pile at the discharge end of this outward conveying system and can be suitably packed. On packing it is necessary to check for completeness, since there is no assurance that the respective storage containers will in fact have been refilled. Furthermore the disadvantages in supplying such an automatic consignment-assembly unit indicated above can still occur. These disadvantages also occur if the computer gives an alarm signal at a device for dispensing the article as well as at the stock container concerned.

There is therefore a need for a procedure that is automated to the greatest possible extent.

This procedure must take into account that many articles are delivered by a supplier only in the form of packs or giant packs; that although many articles are ordered very often, there are others that are very seldom ordered; and that this situation may change with time, for example on seasonal grounds.

OBJECT OF THE INVENTION

It is therefore an object of the invention to provide a method of and a system for making up consignments of articles that enables the assembly to be carried out quickly and reliably, in a simple and space-saving manner, with only a short turn-round time of the articles to be consigned.

SUMMARY OF THE INVENTION

The object is achieved by a method and by a system that are based on a known type of automatic consignment-assembly unit and have the features set forth in the claims.

The invention is based on the discovery that if all the mechanical steps and all the articles arriving at a goods receiving point are known, the flow-path of each article from the goods receiving point to the packing or dispatch area can be precisely predetermined, so that the need to provide overflow areas is completely obviated. Moreover standard parts can be used both for racks and for conveying means, separating (singling) means and intermediate storage. The invention is particularly applicable to making up consignments comprising a very large variety of articles of very different kinds. It can also be arranged as a cascade of several successive stages. A further important advantage is that the system according to the invention can be simply adapted to meet increased requirements, that is to say to an increase in scale and to an increase in the number of the articles to be consigned.

BRIEF DESCRIPTION OF THE DRAWINGS

The invention will now be described in more detail, by way of example, with reference to an embodiment illustrated in the drawings, in which.

DETAILED DESCRIPTION OF PREFERRED EMBODIMENTS OF THE INVENTION

Figure 1:
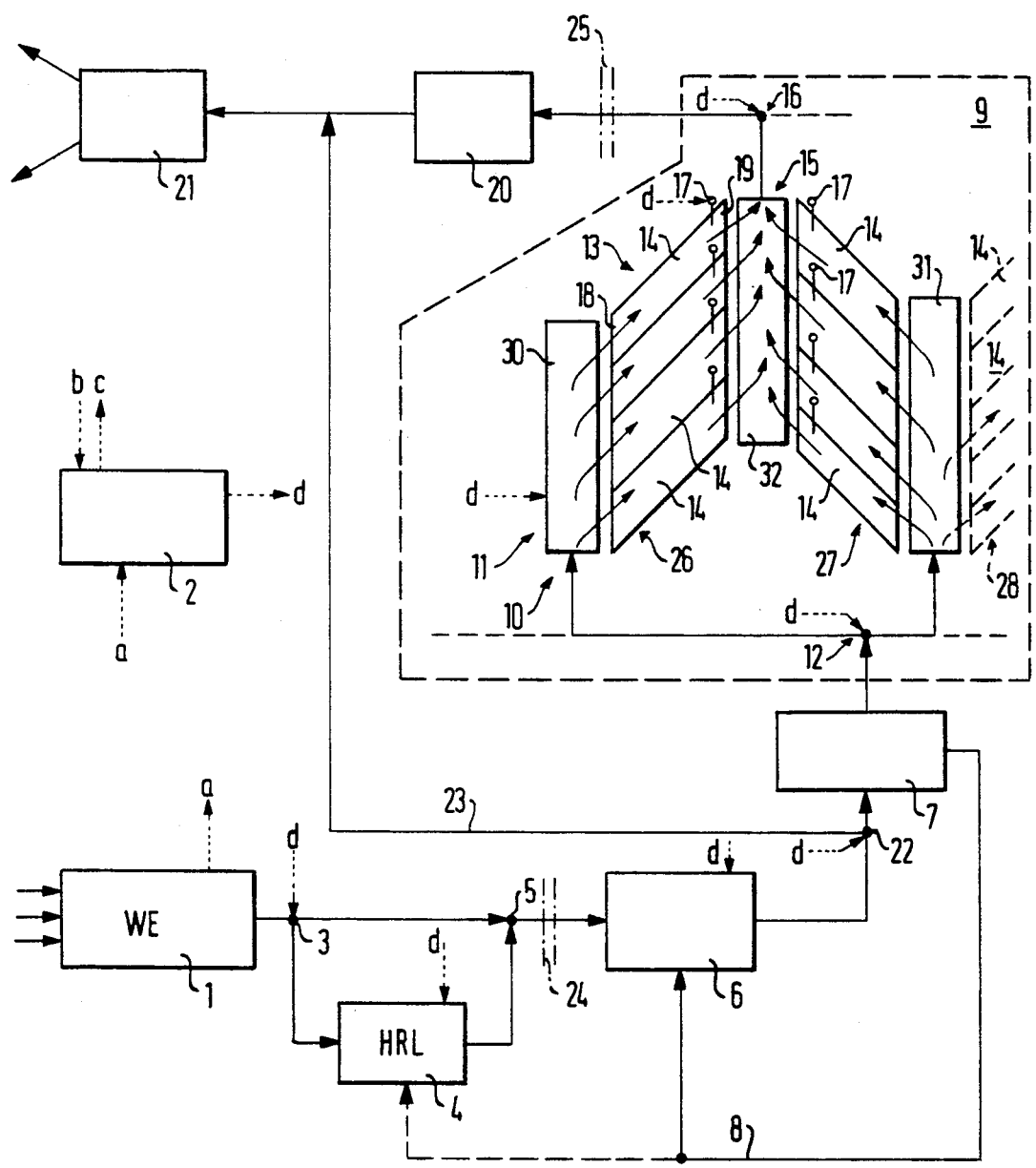
FIG. 1 shows diagrammatically a consignment-assembly system according to the invention.

Referring first to FIG. 1, the invention will be described more fully with reference to an exemplary embodiment relating to the mail-order business.

Goods arriving in the usual manner, which may originate from outside manufacturers and/or dealers or may have been manufactured in-house, are supplied to a receiving point 1, where the delivery is checked in the usual manner for correctness and completeness. Data relating to the incoming goods (goods received data a), are supplied to a computer 2.

The data may be acquired in coded form, for example by means of conventional bar-code stickers on the goods or in a similar manner. In the present case it is advantageous to provide the goods with house stickers or routing tickets bearing corresponding codes.

For the purpose of the following discussion, it will be assumed first of all that the incoming goods arrive in the form of packs comprising a plurality of identical articles, for example cartons with the same contents stacked on a pallet. Such goods may be supplied to the receiving point 1 in large quantities and at a very irregular rhythm. The goods supplied must be made up into consignments, that is to say, the various articles must be assembled in various quantities in accordance with predetermined conditions, for example customer orders in the case of mail-order business. The customer orders are likewise fed to the computer 2 in the form of customer order data b. On the basis of the goods received data a and the customer order data b the computer 2 can determine whether the particular consignment can be assembled or whether orders c for further supplies must be automatically issued. In doing so the computer 2 can, as usual, make projections on the basis of which it determines the probable future demand for particular articles and issues corresponding re-orders c so that the individual consignments corresponding to the customer order data b can be assembled as quickly as possible. In doing so the computer 2 will further take into account that each pack comprises a predetermined number of the respective particular articles; thus there will be packs where there is very little call for the individual articles, while on the other hand there are articles for which the demand is so great that several packs are required in a very short time. In the first case the pack is not needed at once after passing through the receiving point 1, and it can be supplied via a switch 3 controlled by the computer 2 through control data d to a high-bay store 4 from which it will only be called up by the computer on demand, with the aid of control data d, and supplied to an intermediate store 6 via a junction 5. In the second case, when the pack has passed through the receiving point 1 and reached the switch 3 it will be steered by corresponding control data d directly across the junction 5 to the intermediate store 6.

The intermediate store 6 serves as a buffer, particularly to even out differences in timing that result from variations in the quantity and tempo of the supply of the goods at the receiving point 1. It thus forms a kind of ready-use small-part store (just-in-time store or standard carton store).

The intermediate store 6 can be formed in known manner as a queuing or circulating store with a plurality of circulating storage positions each of which can receive one of the packs supplied to the store.

In accordance with control data d from the computer 2 one of the packs is removed on demand from the intermediate store 6 and supplied to a separator 7. This removes from the pack at least one, and often several or even all, of the articles that make it up, and supplies these articles in succession to further processing means. Such separators are known per se (cf. German patent 26 01 067).

If all the articles have not been removed from the pack, the part-empty pack is returned via a return line 8 to the intermediate store 6 or, particularly in the case of articles that are not often required, to the high-bay store 4 as indicated by the broken line.

After all the articles have been removed from a pack the packaging material and supporting means, such as giant cartons, pallets and the like, is disposed of in the usual manner. This is not shown.

Also not shown is that single articles, after unpacking, may be provided with codes, for example by means of a sticker or a ticket applied by an attaching device.

The separated articles are then supplied to an automatic consignment-assembly unit 9 controlled by the computer 2 by means of control data d, which will be further described in detail below.

The consignment-assembly unit 9 consists essentially of an article sorting device 10, having an inward conveying system 11 and if necessary a distributing switch 12, and also of a throughflow store 13 having a plurality of rack sections 14 and an outward conveying system 15, if desired with a junction switch 16. Each section 14 of the rack has associated with it a computer-controlled dispensing device 17 with a counter. Each rack section 14 has a loading end 18 and an unloading end 19, with the dispenser 17 and the counter at the unloading end. The articles are supplied to this consignment-assembly unit 9 in a sequence that has already been pre-sorted under the control of the computer 2. By means of the article sorting device 10 the individual articles are distributed to sections 14 of the rack assigned quite specifically to them: each rack section 14 need only be designed to receive a small number of articles. Frequently-needed articles may be distributed over several rack sections 14, while articles not often needed are only supplied to a rack section 14 on demand, so that at other times this section 14 is available for other articles that are likewise only rarely needed. For the design of the throughflow store 13, i.e. to determine the size and number of rack sections 14 needed, statistical data are employed that take account on the one hand of the average minimum demand for an article (relevant to its dimensions) and on the other hand of the average maximum demand (relevant to the number of rack sections 14). It follows that the rack sections of the throughflow store 13 certainly do not have to be of uniform size. To assemble the individual customer consignments the individual articles are supplied by the dispensing device 17 to the outward conveying system 15 in response to control data d from the computer 2 in predetermined numbers and at a predetermined time, and assembled by means of the junction switch 16 so that all the different articles associated with a particular consignment are brought together at the exit from the consignment-assembly installation 9. The individual consignments are then supplied in succession to a packing unit 20, which puts the various articles together in one or more packages. When more than one package is necessary, since the dimensions of the various articles of a consignment are known as well as their other data, it is possible, with the aid of corresponding data from the computer 2, to supply the articles presorted for inclusion in the respective packages and also to ensure that the packaging material required for each package is automatically made available, likewise on the basis of corresponding data from the computer 2.

Another possibility (not illustrated) is to assemble the consignment in a container instead of in a pile. Since, as mentioned above, the data of a consignment are known, this container can already be a dispatch carton which is supplied under computer control from a stock to the upstream end of the outward conveyor system 15 or to the junction 16.

The packed consignment is then supplied in known manner to a dispatch unit 21 so that the assembled and packed consignment can be sent as quickly as possible to the customer. The dispatch unit 21 can for example sort the packed and ready-to-dispatch articles by destination postal area and/or zip code and frank them accordingly.

Should a customer order be so large that it includes a complete pack of a particular article, this can be supplied direct to the dispatch unit 21, by-passing the consignment-assembly unit. All that is needed for this purpose is a switch 22 after the intermediate store 6 to supply the pack direct to the dispatch unit 21 via a by-pass on the basis of control data d from the computer 2.

An important feature of the procedure according to the invention is that on the basis of all the data at its disposal the computer 2 always knows how many particular articles are available for new order consignments and just where articles already earmarked for order consignments are located. The nature of the consignment-assembly unit 9 and the fact that the articles have already been supplied to it in a presorted sequence also allows overflow areas to be dispensed with. Means for dealing with overflows would be needed if not all the articles supplied could be distributed without exception to rack sections 14 of the throughflow store 13 by the article sorting device 10. Any articles, which could be of any kind, that might be supplied to such an overflow area would have to be returned to the consignment-assembly unit 9; a consignment that still requires an article that had been delivered to the overflow means cannot be dealt with, but still takes up rack space, since the other articles of this consignment cannot be removed from the throughflow store 13. This could cause the whole unit to break down. This risk is avoided by the procedure of the invention.

It may happen that particular goods are not supplied in the form of packs but already as individual articles. Such articles, after receipt at the goods receiving point 1 and transmission of corresponding goods received data a to the computer, and after passing through an intermediate store for these articles corresponding to the intermediate store 6 for the packs, are fed into the consignment-assembly unit 9 by the article sorter 10. This further intermediate store acts as a corresponding time buffer and thus effects presorting in the sense of the present invention.

Alternatively it may happen that particular articles are supplied to the goods receiving point 1 not in the form of ordinary packs but as higher-order "giant" packs comprising a plurality of ordinary packs, which in turn each contain a plurality of articles. For such giant packs the same procedure can be employed, mutatis mutandis. That is to say, the giant packs are buffered in an intermediate store corresponding to the intermediate store 6, separated into single packs in a separator corresponding to the separator 7, and assembled in a consignment-assembly unit corresponding to the consignment-assembly unit 9 into "quasi-consignments" made up of ordinary packs. These pack consignments are then assembled into article consignments in the manner already described via intermediate store 6, separator 7 and consignment-assembly unit 9, and then supplied to the packing unit 20. The computer controlled assembly of these quasi-consignments is preferably done in such a way that it already effects the presorting, so that a special intermediate store does not have to be provided for them, i.e. the intermediate store is replaced by a higher level pack consignment-assembly unit.

This means that units similar to the part of the unit shown in FIG. 1 between the borders 24 and 25 represented by double chain lines can mutatis mutandis, (i.e. if desired without their own intermediate stores)—of course with different dimensions—be connected in series. Such a series connection can be made several times. For example a container loaded with a plurality of pallets may be received at the receiving point 1. Each pallet contains a plurality of giant cartons. Each giant carton contains a plurality of ordinary cartons, and each ordinary carton in turn contains a plurality of articles. The frequency of deliveries in giant packs is the deciding criterion for such a multiple arrangement. If it happens only rarely, the ordinary packs are preferably unpacked from such a giant pack straight away in the goods receiving area 1 (not shown).

FIG. 1 also shows some further details of the consignment-assembly unit 9 which have been found to be particularly advantageous.

The rack sections 14 of the throughflow store 13 may be arranged in a plurality of groups 26, 27, 28. The inward conveyor system 11 has a corresponding plurality of inward conveyors 30, 31 on which the articles are distributed under computer control by means of the distribution switch 12. These inward conveyors 30, 31 may be arranged to supply one group (e.g. the group 26 in the case of the inward conveyor 30) or alternatively to supply a plurality of groups, in particular two groups such as the groups 27 and 28 in the case of the inward conveyor 31. In the same manner the outward conveyor system 15 can correspondingly have a plurality of outward conveyors 32, only one of which is shown in FIG. 1. Here, too, one outward conveyor such as the conveyor 32 can be supplied by more than one group, in particular two groups such as the groups 26 and 27 of the rack sections 14, with the articles supplied to the plurality of outward conveyors 32 then being brought together in the junction switch 16.

Further details of the consignment-assembly unit 9 will now be described with particular reference to FIG. 2, in which the same reference numerals are used for the same parts as in FIG. 1.

Figure 2:
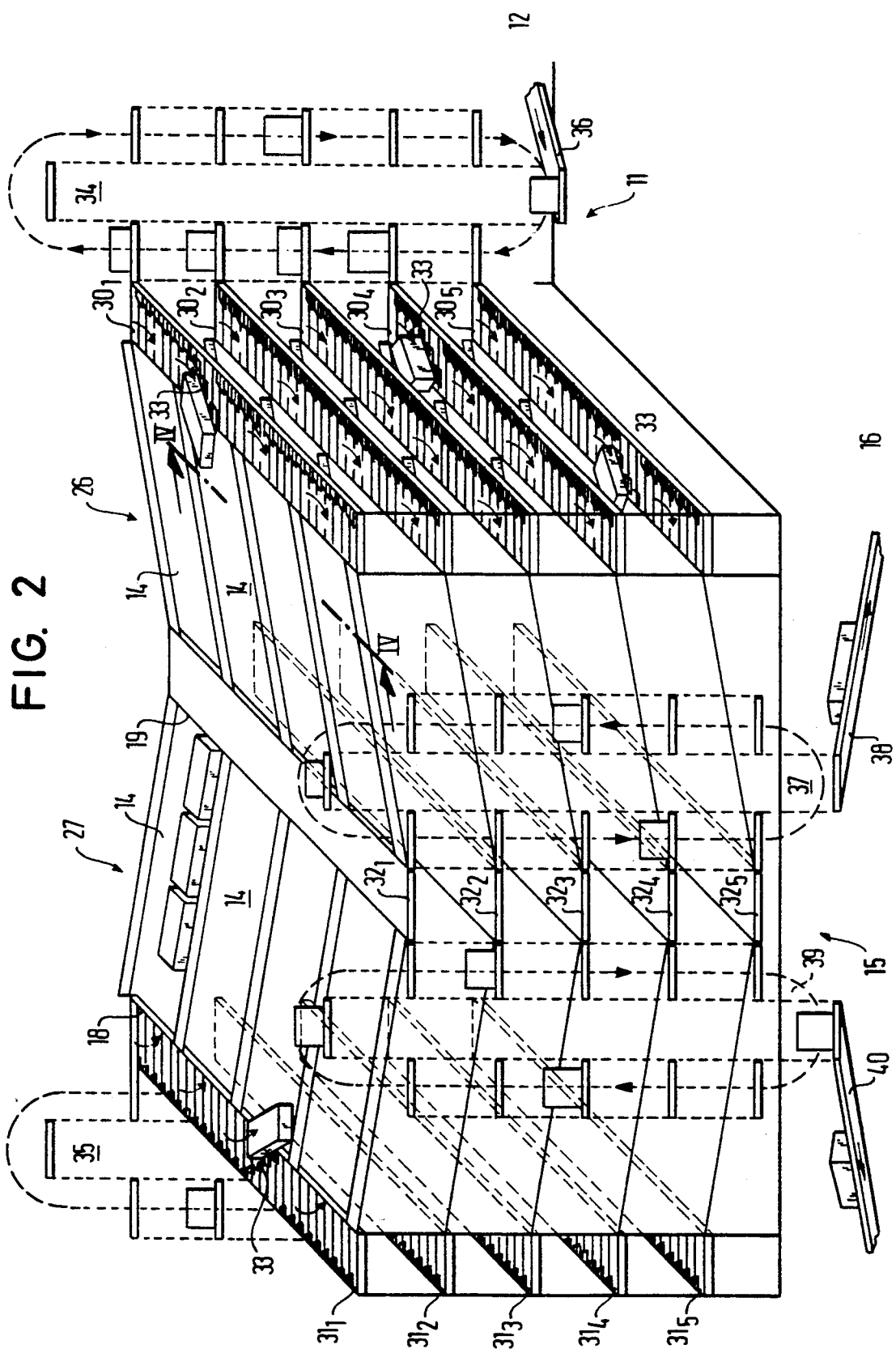
FIG. 2 is a diagrammatic perspective view of a computer-controlled consignment-assembly unit for use in the invention.

FIG. 2 shows an arrangement in which the rack sections 14 in each group 26, 27 are arranged in rows and columns, i.e. in each case a plurality of rack sections 14 are arranged side by side in a plurality of levels or rows. Each rack section 14 is suitably formed as an elongated chute-like stock container in which articles can be arranged one behind another from the loading end 18 to the unloading end 19. The exemplary embodiment shows five rows each of four rack sections 14, but the number of rack sections per row can be different. Each row of rack sections 14 has associated with it a respective inward conveyor 30 or 31 and an outward conveyor 32, with the different rows being indicated by indexes 1, 2 ... 5. As illustrated, the rack sections 14 are inclined from the loading end 18 to the unloading end 19, so that it is not necessary to provide separate conveying means in the rack sections 14: rather, the articles placed in them can slide under gravity towards the output end 19. When control data d from the computer 2 (cf. FIG. 1) initiate the release of one or more of the articles contained in the respective rack section by the dispensing device 17 (not shown here) with its counter, these are placed on the associated outward conveyor 32, likewise by gravity, and then carried along with it. The outward conveyor 32 can therefore be constructed as a simple belt conveyor, though any other type of longitudinal conveyor may be used.

The inward conveyors 30 and 31, which are also in the form of longitudinal conveyors, must however have a transverse conveyor associated with them for each rack section 14. Most simply this may be a diverting conveyor 33 through which an article can be pushed off from the longitudinal conveyor 30 or 31 and into the associated rack section 14.

As already explained with reference to FIG. 1, the articles to be distributed to the respective rack sections 14 are supplied from the distributing switch 12 to the various inward conveyors 30, 31. The distributing switch may be designed so that each inward conveyor 30, 31 is connected at its head end directly to the distributing switch 12 via a supply and distribution conveyor. However, when there are a large number of inward conveyors, particularly in a arrangement such as that shown in FIG. 2, this is very inconvenient. Advantageously, and as shown in FIG. 2, a group of inward conveyors, in particular the inward conveyors $30_1$ to $30_5$ or $31_1$ to $31_5$ that are arranged one above another, has associated with it a respective vertical conveyor 34 or 35, which is suitably a circulating conveyor and can therefore serve as a queuing conveyor and which at one position on its transport path (the bottom in the exemplary embodiment) picks up the respective articles in succession from the switch 12 via a feed conveyor 36 and distributes them on to the individual inward conveyors $30_1$ to $30_5$. The queuing conveyor design has the advantage that if for some unforeseen reason an article cannot be delivered immediately to an inward conveyor this article makes a further circuit in the queuing conveyor before being supplied to the respective inward conveyor.

In the same way each outward conveyor may be connected directly via a respective removal conveyor to the junction 16. Here, too, it is advantageous to associate with each group or column of superimposed outward conveyors $32_1$ to $32_5$ first of all a vertical conveyor 37 that delivers on to a removal conveyor 38 which again takes the article delivered there to the junction switch 16. As a further development of this idea a column of outward conveyors $32_1$ to $32_5$ can have associated with it a further, second vertical conveyor 39 which delivers on to a further, second removal conveyor 40. By this measure a second junction switch (not shown) can be supplied that leads along a second path to another work station in the packing unit or even to another packing unit. In the case of this improvement, each outward conveyor $32_1$ to $32_5$ must have associated with it at its tail end a distributing device (not shown) that distributes the article supplied either on to the first vertical conveyor 37 or the second vertical conveyor 39 on the basis of control data from the computer 2.

Figure 3:
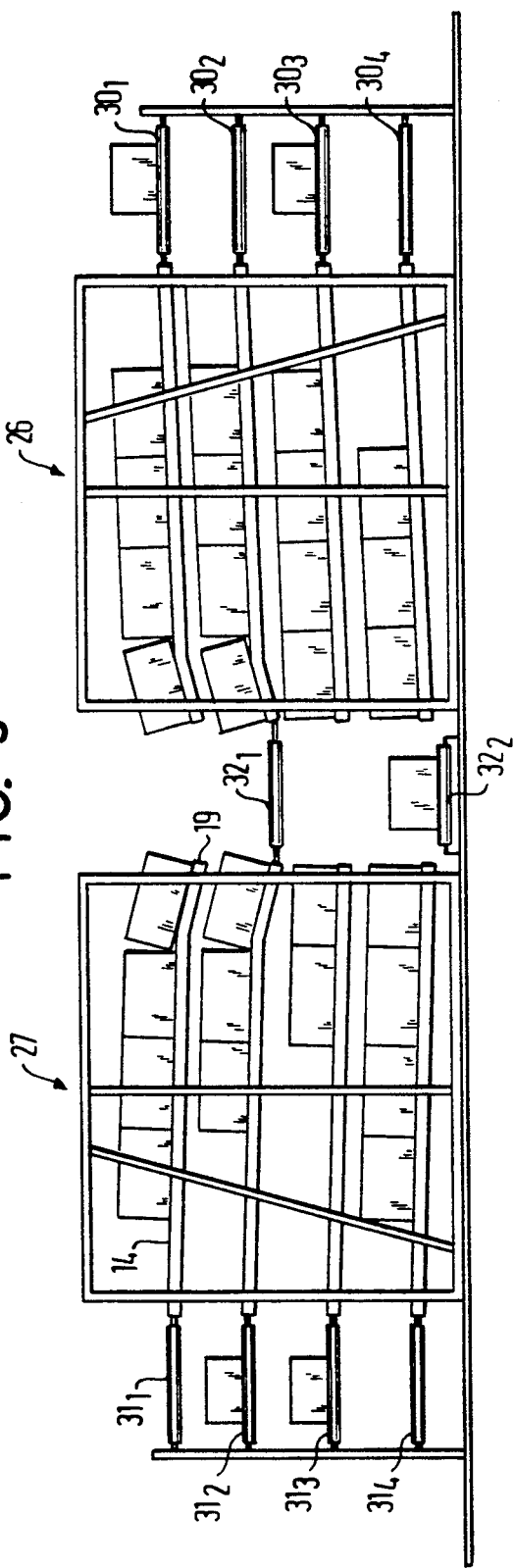
FIG. 3 is a front view of another embodiment of the consignment-assembly unit.

A further variant is illustrated in FIG. 3. As shown there, articles from the rack sections 14 of two superimposed lines of rack sections 14 can be placed on a common outward conveyor $32_1$ or $32_2$. In this case the rack section 14 can have a greater inclination near its unloading end 19.

Depending on the type of articles to be made up into a consignment and which are placed in the various rack sections 14, articles from more than two superimposed rack sections can be placed on a common outward conveyor.

The various articles are generally very different in respect of weight, shape and dimensions. In the Figures only cuboid or carton-like articles, albeit of different dimensions, are shown, without reference symbols. The simple illustration of such rectangular or carton-like articles is however enough to show that very different forms are possible here. The greatest flexibility of the whole unit would obviously be obtained if each rack section 14 were able to accommodate any desired article. For reasons of space it is however advantageous to provide rack sections 14 of different dimensions. For example, rack sections 14 for articles of particularly great height might be provided in a group or even one row of a group. The same might be done for particularly flat articles. In the same way the length of the rack sections 14 of at least one group will be made dependent on the greatest length of article to be handled, but apart from this will attempt to accommodate a specific minimum number of articles of average dimensions in one rack section. For example, FIG. 2 shows at the top left a rack section 14 with three carton-like articles arranged one behind the other in it, while there is obviously no room left for a fourth such article. If another such article has to be placed in the throughflow store 13, it must be placed in another rack section 14, which may even be in another group of the rack section. FIG. 3 shows an embodiment in which 4 carton-like articles can be accommodated one behind the other in each rack section 14.

Standard carton sizes may be used for determining dimensions in the development of such a unit.

In the case of many articles the alignment in which they are conveyed through the unit is unimportant. All that matters is that at the unloading end 19 of each rack section 14 only a predetermined and prestored quantity of the articles placed therein can be delivered on to the outward conveyor 32. However an amount of rotation of the articles in the rack sections 14 such that wedging inside the rack section 14 resulting in stopping up of this path occurs must be avoided. For this reason it is advantageous if the article is conveyed through at least the rack section 14 in a preferred position that is always the same, irrespective of whether the article concerned is actually in the rack section 14. The preferred alignment of the article may already be preset by the separator 7, or alternatively can be achieved elsewhere. Once this preset direction, which can be characterised as alignment in the conveying direction, has been attained, it must not be changed. This is achieved by forming the transverse conveyor 33 as a diverting conveyor, that is to say as a conveyor that does not displace the whole article in the transverse direction, but diverts the front end—in the conveying direction—to a greater extent and leads it into the rack section at an earlier time. Suitably each of the rack sections 14, viewed in the conveying direction, is also arranged at an angle to this direction that is greater than 90° and less than 180°, and preferably is about 135°, as shown in FIG. 1, so that the article can be more easily diverted by the transverse conveyor 33 into the respective rack section 14.

Figure 4:
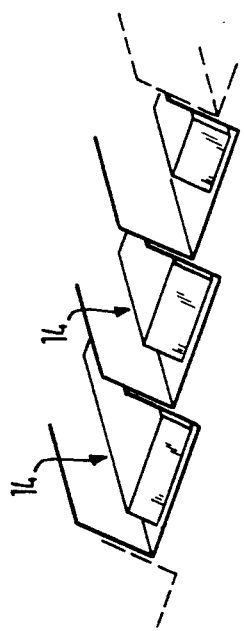
FIG. 4 is a diagrammatic partial section on the line IV—IV in FIG. 2.

It is also advantageous if at least one side face of the article is in an always preset position in the rack section 14. To achieve this each rack section is, as shown in FIG. 4, slightly inclined in the direction counter to the conveying direction of the inward and outward conveyors 11, 15.

For reasons of stability, the preferred position is such that in the case of rectangular articles the narrow side points in a direction against the conveying or flow direction and the largest face is at the top.

The embodiments illustrated show that, as has already been explained, the consignment assembly unit 9 according to FIG. 1 can be extended in all three directions. This extension can be done by adding further rows of rack sections 14 and associated inward and outward conveyors 30, 32 and by extension of the associated vertical conveyor 34. The extension can be done by adding further rack sections in the rows of an existing group and corresponding lengthening of the associated inward and outward conveyors and corresponding displacement of the associated vertical conveyors 34, 37. In addition a complete new group of rack sections 14 with their associated inward and outward conveyors and corresponding vertical conveyors and feed or removal conveyors can be provided. With a suitable form of inward conveyors, their transverse conveyors 33 can be used to supply the rack sections 14 of two adjacent groups of rack sections 14 of a common inward conveyor, as has already been explained in the case of the inward conveyor 31 shown in FIG. 1. As explained, the rack sections 14 can be in the form of an elongated chute-like stock container. This permits building up from individual parts and also the replacement and servicing of individual rack sections 14 without having to bring the whole unit to a standstill. However, independently of the articles concerned other constructions can also be used, such as throughflow racks, channels or the like.

It will also be seen from the discussion that ordinary commercial types of the various conveyors can be used.

As has already been mentioned in the introduction, it is an essential feature of the present unit 9 that the computer 2 obtains all the incoming goods data a and all the customer order data b, and starting from these and the known data about the unit (dimensions, conveyor speeds and the like) itself determines the corresponding control data d and also, dependent on these, updates the inventory data. Based on the design of the whole unit the computer 2 therefore knows exactly where each article is located and where, after any given time, this article will be located or would be located if particular further control data were issued. From this and from the requirement that the articles that are to form part of a consignment must be supplied simultaneously to the packing unit 20 the computer can determine when a particular article must be passed from the separator 7 to the distribution switch 12 and when some pack associated with an article must be taken from the intermediate store 6 or the high-bay store 4.

On the basis of this possibility, provided by the unit according to the invention, the answer can at once be obtained in response to a particular enquiry about an order as to whether it can be executed at once, and in addition a reservation time can be set for it.

This again permits the residence time of the article between the goods receiving point 1 and the dispatch unit 21 to be kept very short, which is very desirable, since all the articles between the goods receiving point 1 and the dispatch unit 21 represent what may be a very large amount of dead capital.

The shorter the residence time of the respective article, the smaller is also the space required for the whole unit.

On the other hand it is not desirable to have to provide temporary storage for incomplete consignments until missing articles are supplied to the goods receiving point. In the same way it is undesirable to make partial deliveries, i.e. to have to divide up individual consignments and only dispatch part-consignments. The invention also permits the assembly of a consignment to be postponed until it is confirmed by goods receipt data a and the other data already available that the respective consignment can be assembled.

The space needed for a consignment-assembly unit of the type shown in FIGS. 1 and 2 will now considered, assuming a standard carton size of $60 \times 50 \times 40$ cm and the requirement to accommodate three such standard cartons in a rack section 14. Using a breadth of about 50–60 cm for the inward and outward conveyors gives a width of about 5 m for the arrangement. The distance apart of superimposed rack sections is, having regard to the necessary dimensions of the conveyors, in the order of about 60 cm. The width of each rack section is about the same as the width of the carton. In a volume of $20 \times 25 \times 25$ m there is therefore room for 32,000 different and altogether 96,000 standard cartons. These standard cartons, however, only occupy the space statistically, but will pass through it to a substantial extent continuously.

The method and system according to the invention can be utilised not only in the mail order business, but also where consignments that are always, or at least to a large extent, the same, have to be made up from numerous individual articles.

What is claimed is:

1. A system for making up consignments of supplied articles from packs of articles comprising
    (a) a supply system,
    (b) an inward conveying system having an intake section, an output section and a transverse conveyor, said supply system adapted for supplying the articles in succession to said intake section,
    (c) an arrangement of rack sections selected from the group consisting of rows, columns and combinations of rows and columns and adapted to provide a throughflow store, each of said rack sections having a loading end, an unloading end and a dispensing means, said loading end being adapted to cooperate with said output section of said inward conveying system and wherein said transverse conveyor is a diverting conveyor adapted to introduce each article delivered into a respective rack section in an alignment determined by the direction of conveyance of the article, said inward conveying system and each of said loading ends of said rack sections being computer controlled to selectively distribute selected quantities of the articles delivered successively from said inward conveying system to particular rack sections, said rack sections including a counting device adapted to detect the articles included in each of the rack sections,
    (d) an outward conveying system adapted to extend past said unloading end of each of said rack sections, said dispensing means of said rack sections being adapted to be computer controlled for selective dispensing of articles from each of said rack sections to said outward conveying system, and (e) a computing system adapted to control said supply system, said inward conveying system, said dispensing means and said outward conveying system.

2. A system according to claim 1 wherein each of said rack sections is disposed at an angle of between 90° and 180° to the direction of conveyance of at least one of said inward and outward conveying systems.

3. A system according to claim 1 wherein said supply system is adapted to supply each of the articles to said inward conveying system automatically and under computer control in the alignment determined by the direction of conveyance of the articles.

4. A system according to claim 1 having a single computer that, on the basis of goods received data (a), customer order data (b) associated with consignments and the article-flow values, controls the supply of articles, their distribution on to the rack sections and their conveyance into consignments.

5. A system according to claim 1 comprising an automatic and computer-controlled separator adapted to remove the articles from a pack and supply the articles in succession to the intake section of the inward conveying system, said separator adapted to remove selected quantities of articles from the pack.

6. A system according to claim 5, wherein an intermediate store is provided as a ready-use small parts store for successively supplied packs of different articles and for returned partly emptied packs.

7. A system according to claim 1 comprising a switch located between said supply system and said inward conveying system, said switch adapted to lead a pack directly to the end of said outward conveying system.

8. A system according to claim 6, wherein the intermediate store is dimensioned for storing the packs, and these packs are unpacked from a giant pack.

9. A system according to claim 4, wherein said computer also issues replacement orders.

10. A system according to claim 1, wherein the inward conveying system comprises at least one conveyor selected from the group consisting of longitudinal and vertical conveyor.

11. A system according to claim 1, wherein the inward conveying system comprises a head end having a queuing conveyor.

12. A system according to claim 11, wherein the queuing conveyor is a vertical circulating conveyor.

13. A system according to claim 1, wherein articles can be assembled into consignments directly into shipping trays or dispatch cartons from the rack sections or the outward conveying system.

14. A system according to claim 11, wherein the rack sections are arranged in rows and columns and each row has associated with it a longitudinal conveyor to which respective corresponding articles can be supplied at said head end via the queuing conveyor.

15. A system according to claim 13 comprising a junction switch and a plurality of outward conveying systems, wherein a dispatch carton associated with a consignment can be supplied under computer control to said junction switch for dispensing to a plurality of outward conveying systems.

16. A system according to claim 1, wherein each rack section is dimensioned to accommodate a minimum number of articles.

17. A system according to claim 1, wherein there are a plurality of rack sections for articles of a given kind, the number of said rack sections being determined by the average maximum demand.

18. A system according to claim 1, wherein the dimensions of each rack section are determined by a standardised article size such as the dimensions of a standard carton.

19. A system according to claim 1, wherein rack sections whose height does not exceed a maximum are assigned to a line of rack sections.

20. A system according to claim 1, wherein each rack section comprises an elongated chute-like stock container inclined from the loading to the unloading end.

21. A system according to claim 1, wherein each of said rack sections is disposed at an angle of approximately 135° to the direction of conveyance of at least one of the inward and outward conveying systems.

22. A system according to claim 1, wherein the rack sections each comprise a deeper edge and are inclined transversely, with the deeper edge pointing to the direction of conveyance of the inward conveying system.

23. A system according to claim 1, wherein the outward conveying system comprises longitudinal conveyors each of which is associated with at least one respective row of rack sections.

24. A system according to claim 1 that includes at least two neighboring groups of rack sections with said inward conveying system disposed between said groups and the loading ends of the rack sections of said two groups being adjacent to the inward conveying system.

25. A system according to claim 24 that includes more than two groups of rack sections, more than one inward conveying system and a distributing switch that distributes the articles supplied to the respective inward conveying systems.

26. A system according to claim 1 that includes at least two neighboring groups of rack sections with said inward conveying system disposed between said groups and the unloading ends of the rack sections of said two groups being adjacent to the outward conveying system.

27. A system according to claim 1 that includes more than two groups of rack sections, more than two outward conveying systems each having an unloading point, at least one queuing conveyor at the unloading point of each outward conveying system, and a junction switch that combines the articles delivered from the queuing conveyor to make up consignments.

28. A method of automatically making up consignments of articles under computer control, the articles being supplied in packs, the method comprising the following steps:
  (a) placing the packs in intermediate storage,
  (b) taking articles from the packs upon demand,
  (c) distributing the articles taken from the packs on at least one rack section of a through flow store,
  (d) calling up the individual articles to be assembled into a consignment from the throughflow store as required, and
  (e) wherein if a pack is only partly unpacked, supplying and placing a resulting part-empty pack to intermediate storage.

29. A method according to claim 28 wherein a pack supplied is itself an article unpacked from a higher-order pack.

* * * * *